(12) United States Patent
Kawahara

(10) Patent No.: US 6,694,835 B2
(45) Date of Patent: Feb. 24, 2004

(54) POWER TRANSMISSION MECHANISM FOR USE IN TOY VEHICLE WITH ENGINE

(75) Inventor: Kazuhiko Kawahara, Shizuoka (JP)

(73) Assignee: Tamiya, Inc., Shizuoka-Ken (JP)

( * ) Notice: Subject to any disclaimer, the term of this patent is extended or adjusted under 35 U.S.C. 154(b) by 18 days.

(21) Appl. No.: 10/215,942

(22) Filed: Aug. 9, 2002

(65) Prior Publication Data
US 2003/0029260 A1 Feb. 13, 2003

(30) Foreign Application Priority Data
Aug. 9, 2001 (JP) ........................... 2001-241993

(51) Int. Cl.$^7$ ............................. F16H 3/08; F16H 37/08
(52) U.S. Cl. ........................... 74/355; 74/378; 475/206; 180/364
(58) Field of Search ..................... 74/333, 347, 355, 74/361, 363, 369, 373, 376, 377, 378; 475/206; 192/12 R, 12 B, 20, 21; 180/364, 369

(56) References Cited

U.S. PATENT DOCUMENTS

| | | | | |
|---|---|---|---|---|
| 1,490,374 A | * | 4/1924 | Foote | 475/206 |
| 1,671,033 A | * | 5/1928 | Kimura | 74/355 X |
| 1,888,810 A | * | 11/1932 | Sieg | 74/355 X |
| 2,791,912 A | * | 5/1957 | Bixby | 74/355 X |
| 3,766,794 A | * | 10/1973 | Wilcox | 74/355 |
| 4,299,134 A | * | 11/1981 | Roy et al. | 475/206 X |
| 4,489,623 A | * | 12/1984 | Hakkenberg | 74/378 |

FOREIGN PATENT DOCUMENTS

| | | | | |
|---|---|---|---|---|
| DE | 33 25 725 A1 | 2/1985 | | |
| DE | 38 03 726 A1 | 8/1989 | | |
| FR | 2 778 718 | 11/1999 | | |
| GB | 2038963 | * | 7/1980 | 74/355 |
| JP | 401105041 | * | 4/1989 | 74/355 |
| JP | P H2-57286 A | 2/1990 | | |
| JP | P H9-285649 A | 11/1997 | | |
| JP | UM 3063758 | 8/1999 | | |
| JP | UM 3063785 B | 8/1999 | | |

* cited by examiner

Primary Examiner—Ha Ho
(74) Attorney, Agent, or Firm—Brinks Hofer Gilson & Lione

(57) ABSTRACT

The power transmission mechanism has a first gear secured to an input shaft. A second gear connectable to the input shaft through a clutch mechanism is provided around the input shaft through a one-way clutch that allows the input shaft to rotate freely in the direction of rotation of the driving force from the engine when the clutch mechanism is in a disengaged state but does not permit rotation of the second gear relative to the input shaft in an opposite direction. A brake mechanism is provided to restrain the rotation of the second gear. A third gear is in mesh with the first gear. A fourth gear is in mesh with the second gear. The power transmission mechanism further has first to third bevel gears. The gear ratio between the first and third gears is equal to that between the second and fourth gears.

4 Claims, 6 Drawing Sheets

POWER TRANSMISSION MECHANISM FOR USE IN TOY VEHICLE WITH ENGINE

RELATED APPLICATIONS

This application claims the benefit of priority under 35 U.S.C. § 119 to Japanese Patent Application No. 241993/2001, filed on Aug. 9, 2001, the entire disclosure of which is incorporated herein by reference.

BACKGROUND OF THE INVENTION

The present invention relates to a power transmission mechanism for use in a toy vehicle with an engine. More particularly, the present invention relates to a mechanism for realizing a smooth shift between forward and reverse operations of a toy vehicle with an engine by radio control.

In order to allow a toy vehicle equipped with an engine to perform reverse running in addition to forward running, it is necessary to solve the problem of the heavy load applied to the rotation transmission mechanism when the clutch is engaged instantaneously during switching between forward rotation and reverse rotation.

To solve the above-described problem, Japanese Patent Application Unexamined Publication (KOKAI) No. Hei 9-285649 proposes a structure in which a forward gear and a reverse gear, which rotate in opposite directions to each other, are disposed at both sides of a clutch plate. Each gear has a circumferential groove and an engaging member fitting hole formed on the front side thereof. The engaging member fitting hole intersects the groove at right angles. A metallic engaging member is fitted in the engaging member fitting hole. With this structure, however, it is difficult to provide a braking function. If a braking function is provided, the structure is expected to become extremely complicated because it is necessary to construct a brake mechanism that operates for each of the forward and reverse gears.

Another structure that allows reverse running in addition to forward running is disclosed in Japanese Patent Post-Exam Publication No. Hei 5-70479. The structure has two clutch mechanisms for transmitting rotational force of an engine to a rotational driving shaft through gears. A rotary disk of one clutch mechanism is held with a brake member, and a brake member for a rotary disk of the other clutch mechanism is opened to allow the rotary disk to rotate, thereby enabling the rotational driving shaft to be rotated either forwardly or reversely. However, this method requires a complicated structure and is hence likely to suffer increased costs.

SUMMARY OF THE INVENTION

Accordingly, an object of the present invention is to provide a power transmission mechanism for use in a toy vehicle with an engine that realizes a smooth shift between a forward operation and a reverse operation with a relatively simple structure.

To attain the above-described object, the present invention provides a power transmission mechanism for use in a toy vehicle with an engine. The power transmission mechanism includes an input shaft capable of transmitting rotational driving force from an engine, and an output shaft capable of transmitting the rotational driving force to a driving wheel of the toy vehicle. A first gear is secured to the input shaft. A second gear connectable to the input shaft through a clutch mechanism is provided around the input shaft through a one-way clutch that allows the input shaft to rotate freely in the direction of rotation of the driving force from the engine when the clutch mechanism is in a disengaged state but does not permit rotation of the second gear relative to the input shaft in a direction opposite to the direction of rotation of the driving force from the engine. A brake mechanism is provided to restrain the rotation of the second gear. A third gear is provided around the output shaft. The third gear is in mesh with the first gear. A fourth gear is provided around the output shaft. The fourth gear is in mesh with the second gear. A first bevel gear is secured to the output shaft. A second bevel gear is provided on the output shaft in a free state to face the first bevel gear. The second bevel gear is secured to the third gear. A third bevel gear is provided at a fixed position with respect to the fourth gear. The third bevel gear is in mesh with both the first bevel gear and the second bevel gear. The gear ratio between the first gear and the third gear is equal to the gear ratio between the second gear and the fourth gear.

In the forward mode of the present invention, as the input shaft rotates, the first gear rotates, thereby driving the third gear to rotate. The rotation of the input shaft causes the clutch mechanism to be engaged. Consequently, the second gear rotates, thereby driving the fourth gear to rotate. Because the gear ratio between the first gear and the third gear is the same as that between the second gear and the fourth gear, the third gear and the fourth gear rotate synchronously, and the output shaft is driven so that the wheels rotate in the forward direction.

In the reverse mode, the clutch mechanism is disengaged, and the brake of the brake mechanism is activated. Because the clutch mechanism has been disengaged, the second gear and the fourth gear, which is in mesh with the second gear, are not driven. The third gear driven by the rotation of the first gear drives the output shaft to rotate in a direction opposite to the direction in the forward mode through the first to third bevel gears so that the wheels rotate in the reverse direction.

In the brake mode, the clutch mechanism is disengaged, and the brake of the brake mechanism is activated as in the case of the reverse mode. Although the rotation of the wheels causes the output shaft to rotate, because the fourth gear is placed stationary, the third gear is caused to rotate in a direction opposite to the direction of rotation of the output shaft through the first to third bevel gears. Consequently, the input shaft is urged to rotate in the locking direction of the one-way bearing through the first gear. However, because the rotation of the second gear is restrained by the brake mechanism, the rotation of the third gear performs the function of braking the output shaft, i.e. the wheels.

Thus, the present invention allows a toy vehicle with an engine to perform reverse running with a relatively simple structure by employing bevel gears as stated above. It also becomes possible to apply the brakes.

Preferably, the clutch mechanism in the above-described power transmission mechanism is engaged when a user actuates a throttle trigger for operating the toy vehicle to establish a forward mode, and disengaged when the user actuates the throttle trigger to establish a reverse mode. Thus, the present invention allows the clutch mechanism to be engaged and disengaged simply by operating the throttle trigger in each mode.

Preferably, the brake mechanism in the power transmission mechanism does not perform a braking operation when the user actuates the throttle trigger to establish the forward mode, but activates a braking operation when the user actuates the throttle trigger to establish the reverse mode.

Thus, the present invention allows the brake mechanism to be activated and released simply by operating the throttle trigger in each mode.

Preferably, the above-described clutch mechanism includes a clutch housing. A plurality of clutch shoes are accommodated in the clutch housing so that when the clutch shoes move outward, the outer peripheral surfaces thereof are capable of coming in frictional contact with the inner surface of the clutch housing. The clutch shoes each have a claw extending in the axial direction of the input shaft. A clutch cam is secured to the input shaft to lie between the clutch shoes. The clutch cam is adapted to move the clutch shoes so that the outer peripheral surfaces thereof come in frictional contact with the inner surface of the clutch housing by a cam action in response to the rotation of the input shaft. The clutch mechanism further includes a shift ring having claw restraining grooves corresponding in number to the claws. The shift ring is movable between a first position at which the claws are released from the claw restraining grooves to allow the clutch shoes to come in frictional contact with the inner surface of the clutch housing and a second position at which the claws are received in the claw restraining grooves to restrain the clutch shoes from moving so as to come in frictional contact with the inner surface of the clutch housing. When the user actuates the throttle trigger to establish the forward mode, the shift ring moves to the first position, whereas when the user actuates the throttle trigger to establish the reverse mode, the shift ring moves to the second position.

According to the present invention, simply actuating the throttle trigger causes the shift ring to move in the axial direction of the input shaft, thereby making it possible to restrain the clutch shoes from coming in frictional contact with the inner surface of the clutch housing and to release the clutch shoes from the restraint.

The above and other objects, features and advantages of the present invention will become more apparent from the following description of the preferred embodiment thereof, taken in conjunction with the accompanying drawings.

DETAILED DESCRIPTION OF THE INVENTION

Figure 1:
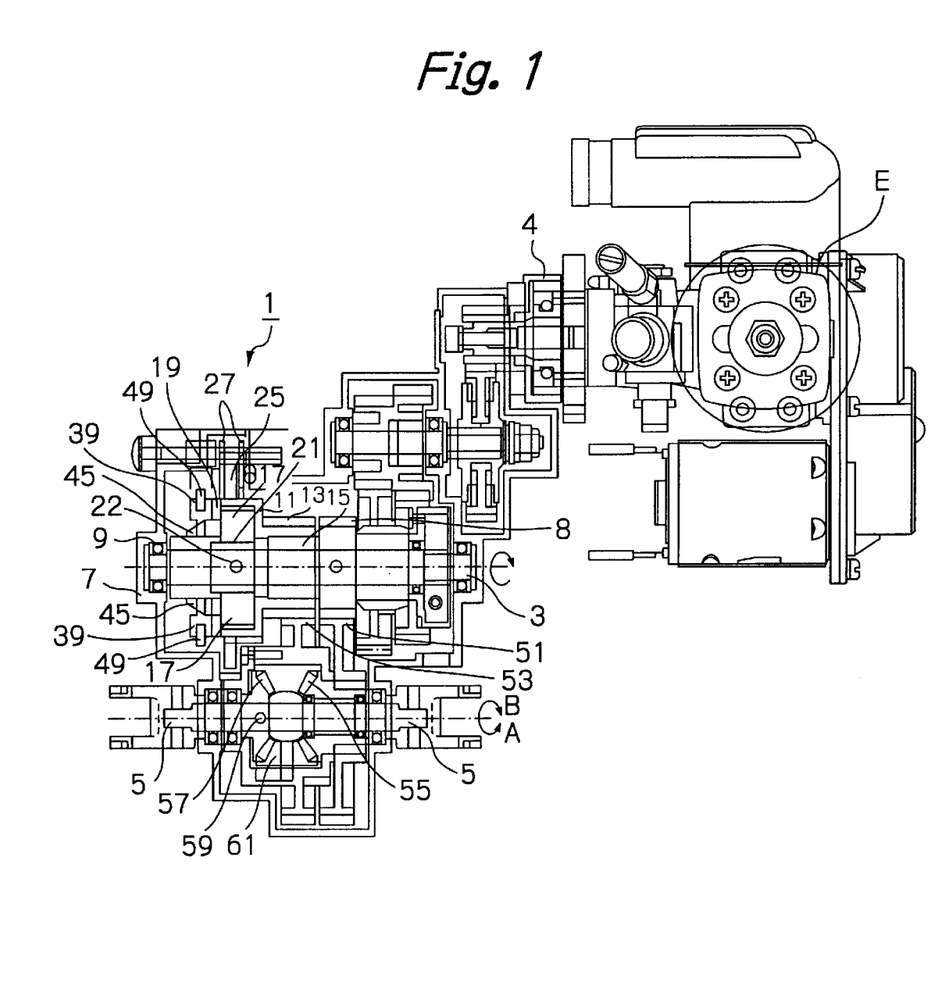
FIG. 1 is a sectional side view showing a power transmission mechanism for use in a toy vehicle with an engine according to the present invention and also illustrating the way in which the power transmission mechanism is connected to an engine through a centrifugal clutch.

An embodiment of the present invention will be described below with reference to the accompanying drawings. FIG. 1 shows a power transmission mechanism 1 for use in a toy vehicle with an engine according to the present invention and also illustrates the way in which the power transmission mechanism 1 is connected to an engine E through a centrifugal clutch 4. The power transmission mechanism 1 has an input shaft 3 capable of transmitting the power of the engine E through the centrifugal clutch 4 and a proper gear train subsequent thereto. The power transmission mechanism 1 further has an output shaft 5 connectable to a driving wheel (not shown).

The distal end of the input shaft 3 is rotatably supported by a bearing 9 provided in a housing 7. A pinion 8, which is equivalent to a first gear, is secured to an intermediate portion of the input shaft 3. A clutch housing 11 is provided adjacent to the pinion 8. A gear 13, which is equivalent to a second gear, is formed on a side of the clutch housing 11 closer to the pinion 8. A one-way bearing 15 is provided between the inner side of the gear 13 and the input shaft 3. The one-way bearing 15 allows the input shaft 3 to rotate clockwise relative to the clutch housing 11 as viewed from the pinion 8 side but does not permit counterclockwise rotation of the input shaft 3.

Two clutch shoes 17 are accommodated in the clutch housing 11. A clutch cam retaining member 19 is provided in such a manner as to close the clutch housing 11. A clutch cam 21 is retained on the center of the clutch cam retaining member 19. The clutch cam 21 is secured to the input shaft 3 by engagement with a pin 22. The clutch cam 21 is located between the two clutch shoes 17. When the input shaft 3 rotates, the clutch cam 21 urges the clutch shoes 17 outward by the cam action thereof, thereby allowing the clutch shoes 17 to be brought into frictional contact with the inner surface of the clutch housing 11.

Figure 2:
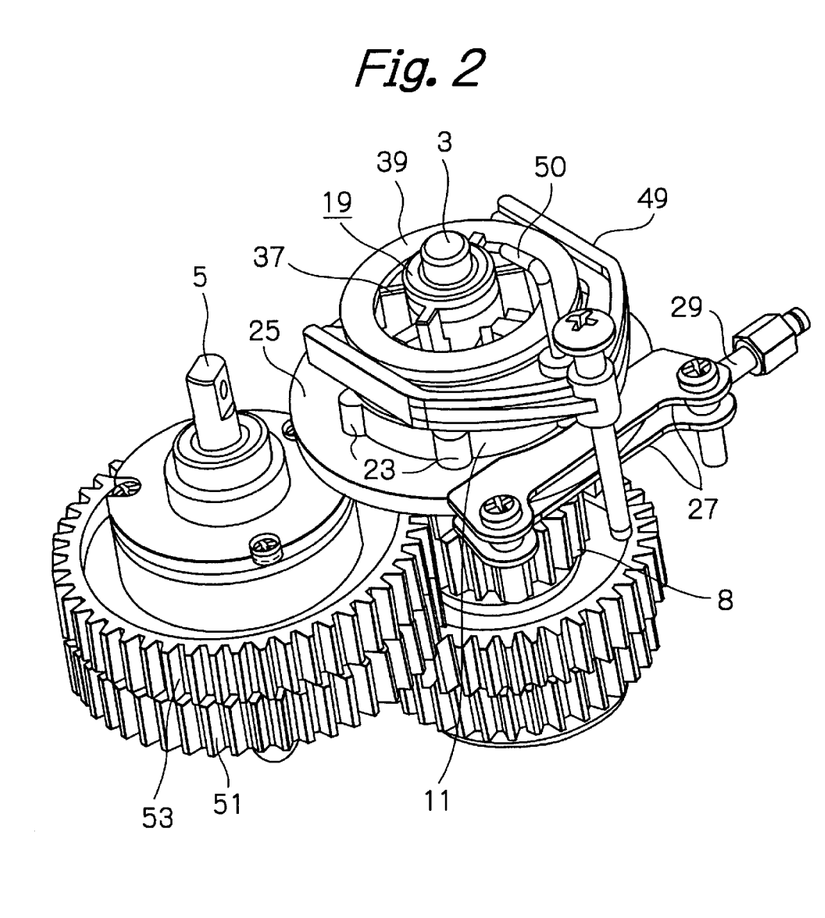
FIG. 2 is a perspective view showing the power transmission mechanism in a state where a housing thereof is removed.

As shown in FIG. 2, six projections 23 are formed on the outer peripheral surface of the clutch housing 11. A brake disk 25 is provided around the clutch housing 11. The brake disk 25 has recesses at respective positions corresponding to the projections 23 so that the recesses are engaged with the projections 23. A part of the brake disk 25 lies between two brake pads 27 provided on the housing 7. A rotating shaft 29 is provided adjacent to one of the brake pads 27. The rotating shaft 29 has a cam mechanism (not shown). As the rotating shaft 29 rotates, the brake disk 25 is strongly clamped between the two brake pads 27, thus exhibiting a braking action.

The rotating shaft 29 is connected with a rotational driving mechanism (not shown). When the user actuates a throttle trigger to establish the brake mode (described later) or the reverse mode (described later), the rotational driving mechanism is driven by radio to rotate the rotating shaft 29. Thus, the above-described braking action is exhibited.

Figure 4:
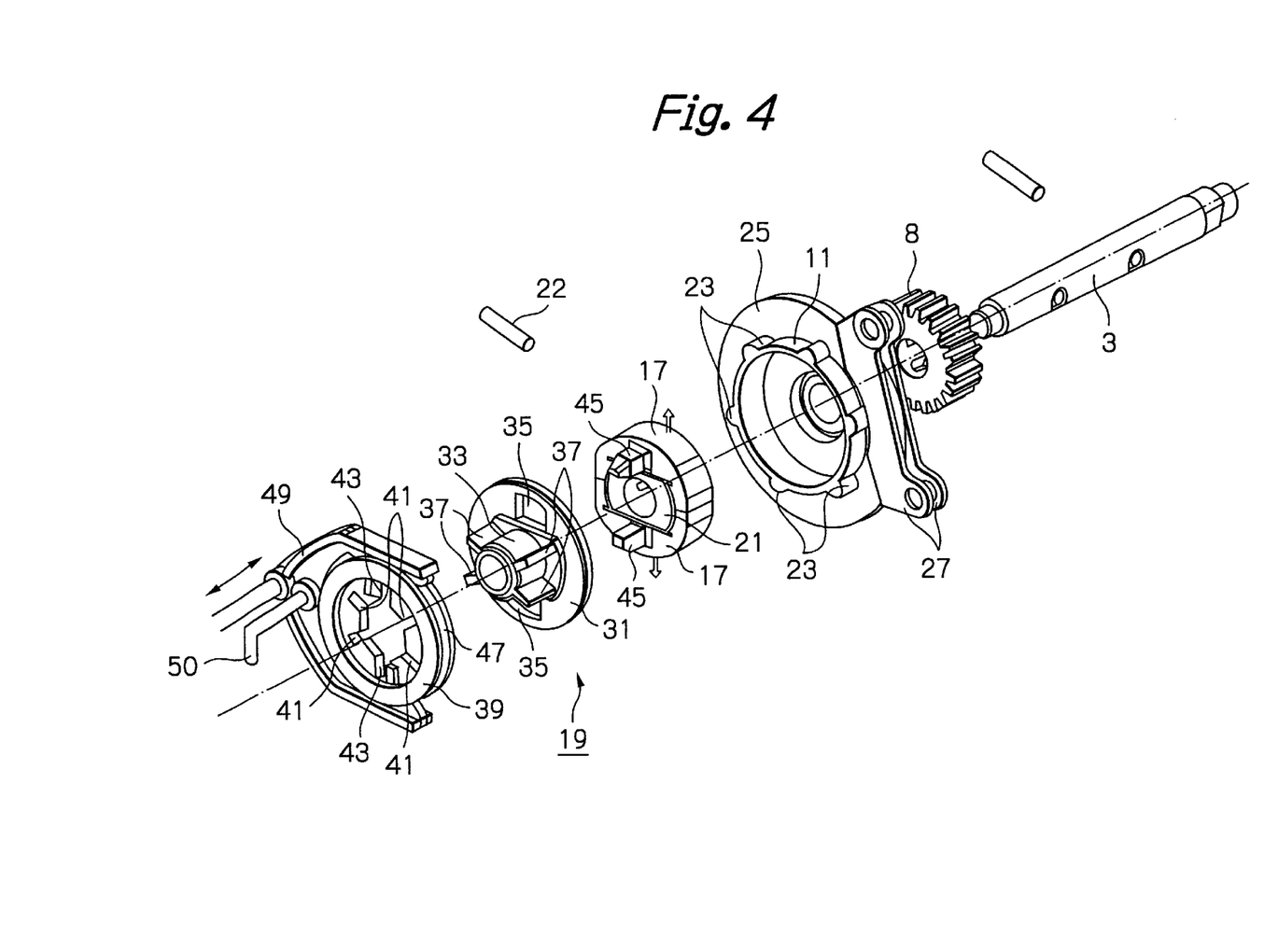
FIG. 4 is an exploded perspective view showing members provided on an input shaft.

As shown in FIG. 4, the clutch cam retaining member 19 is provided with a disk portion 31 and a projecting portion 33 projecting from the center of the disk portion 31 toward a direction in which the input shaft 3 extends. The disk portion 31 has two cut portions 35 formed at respective positions that are in point symmetry with each other. Four radially extending engaging pieces 37 are formed on the projecting portion 33.

A shift ring 39 is provided at a position adjacent to the clutch cam retaining member 19. The shift ring 39 has four grooves 41 formed radially at respective positions corresponding to the four engaging pieces 37 on the clutch cam retaining member 19. The shift ring 39 further has claw restraining grooves 43 each formed between two adjacent pairs of grooves 41. The shift ring 39 is engaged with the clutch cam retaining member 19 slidably in the direction of extension of the input shaft 3 in a state where the rotation of the shift ring 39 with respect to the clutch cam retaining member 19 is restrained by fitting of the four grooves 41 with the four engaging pieces 37 on the clutch cam retaining member 19.

The above-described two clutch shoes 17 have respective claws 45 projecting from the clutch housing 11 toward the direction of extension of the input shaft 3. The claws 45 extend through the cut portions 35 of the disk portion 31 to the shift ring 39 side of the clutch housing 11. The claw restraining grooves 43 in the shift ring 39 are formed in alignment with the positions of the claws 45.

An outer peripheral groove 47 is formed on the outer periphery of the shift ring 39. The outer peripheral groove 47 is engaged with a slide fork 49 extending from one side of the shift ring 39. The slide fork 49 is slidable in the axial direction of the input shaft 3. When the slide fork 49 moves toward the clutch housing 11, the claws 45 enter the claw restraining grooves 43, thereby restraining the outward expanding movement of the two clutch shoes 17. When the slide fork 49 moves away from the clutch housing 11, the claws 45 come out of the claw restraining grooves 43, thereby allowing the clutch shoes 17 to engage the inner surface of the clutch housing 11.

The slide fork 49 has a hook-shaped engaging portion 50, which is connected to a slide driving mechanism (not shown). When the user actuates the throttle trigger to establish the forward mode (described later), the slide driving mechanism is driven by radio to move the hook-shaped engaging portion 50 and hence the slide fork 49 away from the clutch housing 11, thereby allowing the clutch shoes 17 to engage the inner surface of the clutch housing 11. When the user actuates the throttle trigger to establish the reverse mode, the slide fork 49 moves toward the clutch housing 11. Consequently, the claws 45 enter the claw restraining grooves 43. Thus, the clutch is disengaged.

Next, the structure of the output shaft 5 side of the power transmission mechanism 1 will be described. The output shaft 5 is provided with a drive spur gear 51 equivalent to a third gear, which is in mesh with the pinion 8. A reverse gear carrier 53, which is equivalent to a fourth gear, is provided at a position adjacent to the drive spur gear 51. The reverse gear carrier 53 is in mesh with the gear 13 on the clutch housing 11. The gear ratio between the pinion 8 and the drive spur gear 51 is set equal to that between the gear 13 on the clutch housing 11 and the reverse gear carrier 53.

Figure 3:
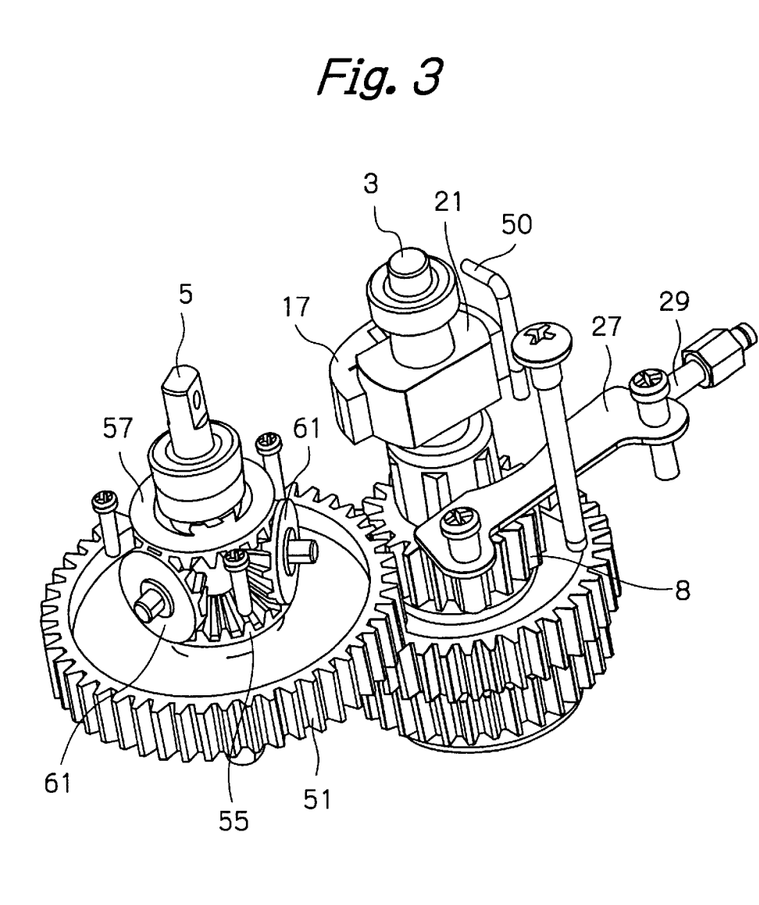
FIG. 3 is a perspective view showing a clutch mechanism and first to third bevel gears used in the power transmission mechanism.

As shown in FIGS. 1 and 3, a first bevel gear 55 is provided in the reverse gear carrier 53. A second bevel gear 57 is provided to face the first bevel gear 55. The second bevel gear 57 is secured to the output shaft 5 with a pin 59. Between the first bevel gear 55 and the second bevel gear 57, three third bevel gears 61 are provided in mesh with them.

The power transmission mechanism 1 for use in a toy vehicle with an engine according to the present invention has the above-described arrangement. The operation of the power transmission mechanism 1 will be described below.

Forward Mode

Figure 5:
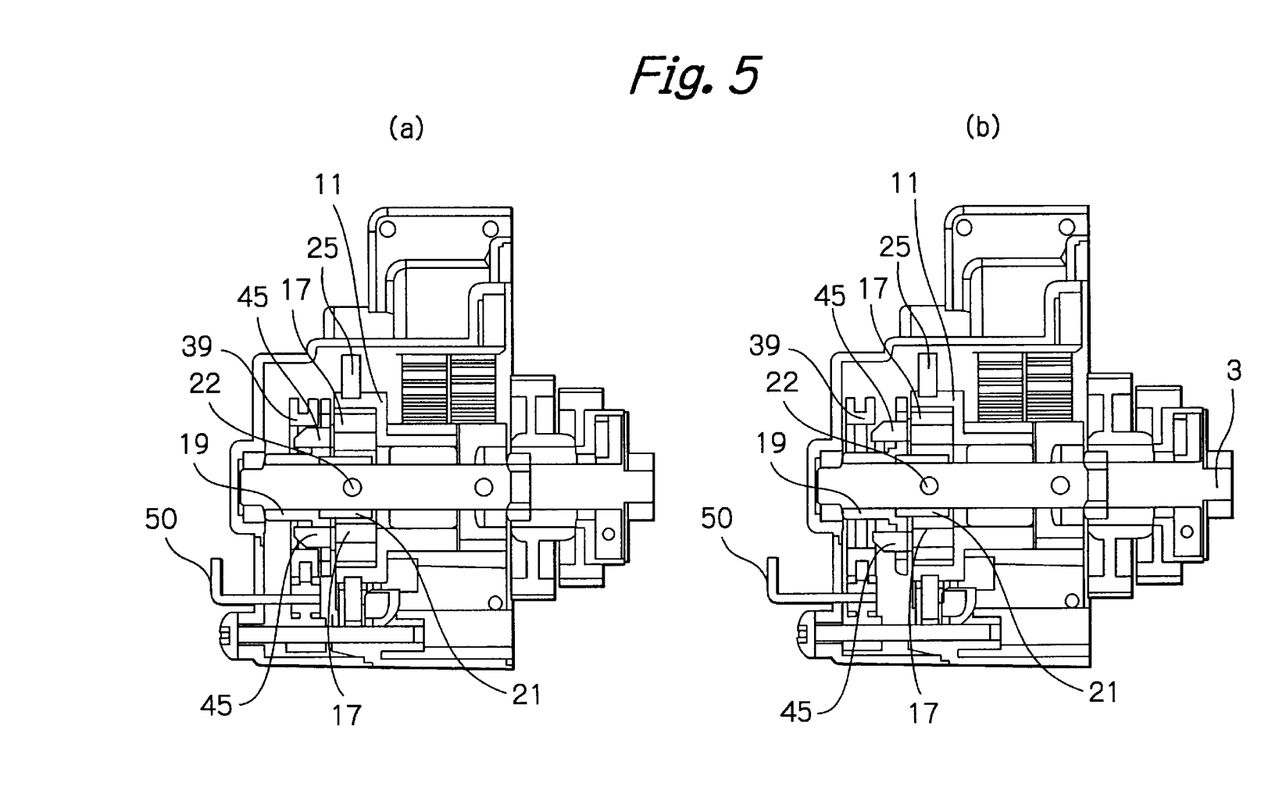
FIG. 5(a) is a sectional side view showing the clutch in a disengaged state.
FIG. 5(b) is a sectional side view showing the clutch in an engaged state.

In the forward mode, the centrifugal clutch 4 is in an engaged state. The brake disk 25 is not clamped between the brake pads 27. Accordingly, the brakes are not applied. As shown in FIG. 5(*b*), the shift ring 39 is separate from the claws 45. Therefore, when the clutch cam 21 rotates, the clutch shoes 17 are movable outward by the cam action.

Figure 6:
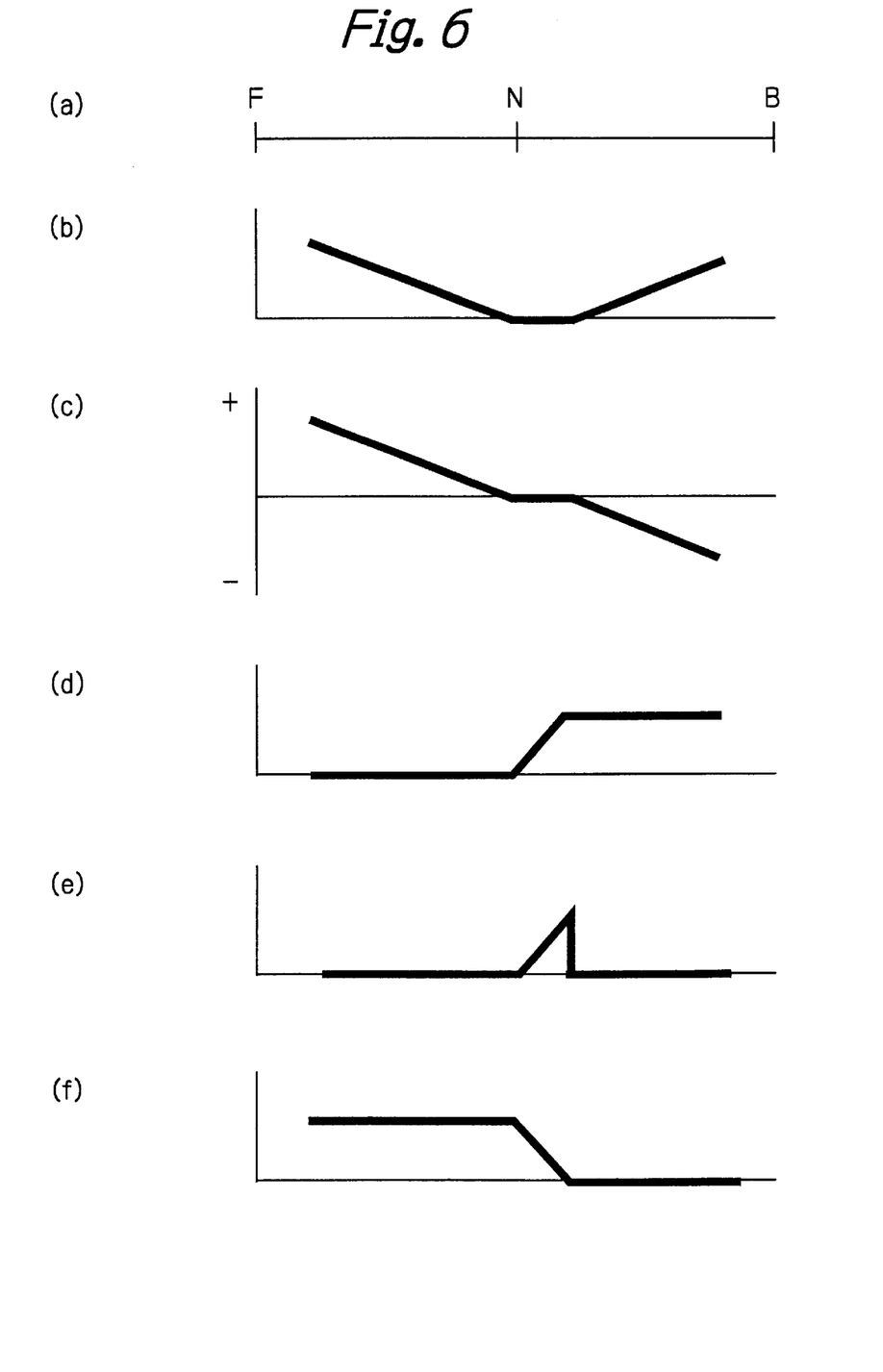
FIGS. 6(a) to 6(f) are schematic views showing the relationship between a throttle trigger, brake operating condition, clutch operating condition, and so forth.

In this state, if the throttle trigger (not shown) is pulled toward the forward F side (see FIG. 6*a*), as shown in FIG. 6(*b*), the throttle opening increases and hence the engine output increases according as the throttle trigger is pulled.

When the input shaft 3 rotates as the engine is driven, the pinion 8 secured to the input shaft 3 rotates, causing the drive spur gear 51 to rotate. The rotation of the input shaft 3 causes the clutch cam 21 to urge the clutch shoes 17 outward by the cam action. Consequently, the outer peripheral surfaces of the clutch shoes 17 are brought into frictional contact with the clutch housing 11 to transmit the rotational drive of the input shaft 3 to the clutch housing 11 (see FIG. 6*f*). Thus, the reverse gear carrier 53, which is in mesh with the gear 13 on the clutch housing 11, is rotated. It should be noted that, in the forward mode, the one-way bearing 15 operates to allow free rotation of the clutch housing 11 relative to the input shaft 3.

Because the gear ratio between the pinion 8 and the drive spur gear 51 is the same as that between the gear 13 on the clutch housing 11 and the reverse gear carrier 53, the drive spur gear 51 and the reverse gear carrier 53 rotate synchronously. Consequently, the output shaft 5 can be rotated in the direction indicated by the arrow A in FIG. 1. Thus, the wheels (not shown) of the toy vehicle can be driven in the forward direction.

Reverse Mode

In the reverse mode, the centrifugal clutch 4 is in an engaged state, and the brake disk 25 is clamped between the brake pads 27 to apply the brakes (see FIG. 6*d*). Further, as shown in FIG. 5(*a*), the shift ring 39 moves toward the claws 45, and the claws 45 enter the two cut portions 35 of the shift ring 39, making it impossible for the clutch shoes 17 to move outward.

If the throttle trigger is shifted toward the reverse B side (see FIG. 6*a*) in this state, the pinion 8 rotates, causing the drive spur gear 51 to rotate in the same way as in the forward mode.

Meanwhile, the clutch is in a disengaged state (see FIG. 6(*f*) because the clutch shoes 17 cannot move outward. Accordingly, the rotational drive of the input shaft 3 is not transmitted to the clutch housing 11. Further, because the brake disk 25 is clamped to apply the brakes, the clutch housing 11, which is engaged with the brake disk 25, is in a stationary state. Consequently, the reverse gear carrier 53, which is in mesh with the gear 13 on the clutch housing 11, is also in a stationary state. Accordingly, the driving force from the input shaft 3 is transmitted to the output shaft 5 side solely through the drive spur gear 51.

When the drive spur gear 51 rotates in a state where the reverse gear carrier 53 is placed stationary, the direction of rotation of the second bevel gear 57 secured to the output shaft 5 becomes opposite to the direction of rotation of the first bevel gear 55. Accordingly, the output shaft 5 rotates in the direction indicated by the arrow B in FIG. 1 (see the fact that the transmission output shaft revolving speed is on the negative side in FIG. 6*c*. Thus, the wheels (not shown) of the toy vehicle can be driven in the reverse direction.

Brake Mode

The brake mode is an operating mode established when the throttle trigger is positioned immediately behind the N (neutral) position on the reverse side, as shown in FIG. 6(*a*). That is, the brake mode is present halfway during switching between the forward mode and the reverse mode. When no load is applied to the throttle trigger, the throttle trigger tends to return to the N position automatically by the spring action. When the throttle trigger shifts to the N position during running of the toy vehicle, the brake mode is automatically established. In the brake mode, the centrifugal clutch 4 is in a disengaged state. Therefore, the driving force of the engine E is not transmitted to the input shaft 3. Accordingly, the input shaft 3 is in a free state.

As shown in FIG. 6(*d*), according as the throttle trigger shifts from the neutral position to the reverse mode side, the degree to which the brake disk 25 is clamped between the brake pads 27 increases. Thus, the brakes are applied. Meanwhile, the clutch pressing force gradually decreases (see FIG. 6*f*). In the brake mode, the throttle opening is zero (see FIG. 6*b*). The transmission of the drive from the engine to the input shaft 3 is cut off. Accordingly, the input shaft 3 is in a free state. Further, because the rotation of the brake disk 25 is restrained, the reverse gear carrier 53 cannot rotate.

If the brake mode is established when the toy vehicle is running, because the reverse gear carrier 53 cannot rotate, the output shaft 5 rotating in the direction indicated by the arrow A in FIG. 1 by the rotation of the wheels of the toy vehicle during forward running, for example, causes the drive spur gear 51 to rotate in a direction opposite to the direction of rotation of the output shaft 5 through the second bevel gear 57, the third bevel gears 61 and the first bevel gear 55.

The drive spur gear 51 urges the input shaft 3 to rotate through the pinion 8. However, the direction of rotation of the input shaft 3 at this time is a direction in which the clutch housing 11 cannot rotate relative to the input shaft 3 owing to the action of the one-way bearing 15. Accordingly, force acts so as to urge the clutch housing 11 to rotate together with the input shaft 3. However, because the rotation of the brake disk 25 is restrained, the clutch housing 11 is restrained from rotating. Consequently, the rotation of the output shaft 5, i.e. the rotation of the wheels, is braked.

Thus, in the forward mode of the present invention, as the input shaft rotates, the first gear rotates, thereby driving the third gear to rotate. The rotation of the input shaft causes the clutch mechanism to be engaged. Consequently, the second gear rotates, thereby driving the fourth gear to rotate. Because the gear ratio between the first gear and the third gear is the same as that between the second gear and the fourth gear, the third gear and the fourth gear rotate synchronously, and the output shaft is driven so that the wheels rotate in the forward direction.

In the reverse mode, the clutch mechanism is disengaged, and the brake of the brake mechanism is activated. Because the clutch mechanism has been disengaged, the second gear and the fourth gear, which is in mesh with the second gear, are not driven. The third gear driven by the rotation of the first gear drives the output shaft through the first to third bevel gears so that the wheels rotate in the reverse direction.

In the brake mode, the clutch mechanism is disengaged, and the brake of the brake mechanism is activated as in the case of the reverse mode. Although the rotation of the wheels causes the output shaft to rotate, because the fourth gear is placed stationary, the third gear is caused to rotate in a direction opposite to the direction of rotation of the output shaft through the first to third bevel gears. Consequently, the input shaft is urged to rotate in the locking direction of the one-way bearing through the first gear. However, because the rotation of the second gear is restrained by the brake mechanism, the rotation of the third gear performs the function of braking the output shaft, i.e. the wheels.

Thus, the present invention allows a toy vehicle with an engine to perform reverse running with a relatively simple structure by employing bevel gears as stated above. It also becomes possible to apply the brakes.

It should be noted that the present invention is not necessarily limited to the foregoing embodiment but can be modified in a variety of ways without departing from the gist of the present invention.

What is claimed is:

1. A power transmission mechanism for use in a toy vehicle with an engine, comprising:

an input shaft capable of transmitting rotational driving force from an engine;

an output shaft capable of transmitting the rotational driving force to a driving wheel of the toy vehicle;

a first gear secured to said input shaft;

a second gear connectable to said input shaft through a clutch mechanism, said second gear being provided around said input shaft through a one-way clutch that allows said input shaft to rotate freely in a direction of rotation of the driving force from the engine when said clutch mechanism is in a disengaged state but does not permit rotation of said second gear relative to said input shaft in a direction opposite to the direction of rotation of the driving force from the engine;

a brake mechanism for restraining rotation of said second gear;

a third gear provided around said output shaft, said third gear being in mesh with said first gear;

a fourth gear provided around said output shaft, said fourth gear being in mesh with said second gear;

a first bevel gear secured to said output shaft;

a second bevel gear provided on said output shaft in a free state to face said first bevel gear, said second bevel gear being secured to said third gear; and a third bevel gear provided at a fixed position with respect to said fourth gear, said third bevel gear being in mesh with both said first bevel gear and said second bevel gear;

wherein a gear ratio between said first gear and said third gear is equal to a gear ratio between said second gear and said fourth gear.

2. A power transmission mechanism according to claim 1, wherein said clutch mechanism is engaged when a user actuates a throttle trigger for operating said toy vehicle to establish a forward mode, and disengaged when the user actuates said throttle trigger to establish a reverse mode.

3. A power transmission mechanism according to claim 1, wherein said brake mechanism does not perform a braking operation when a user actuates a throttle trigger for operating said toy vehicle to establish a forward mode, but activates the braking operation when the user actuates said throttle trigger to establish a reverse mode.

4. A power transmission mechanism according to claim 2, wherein said clutch mechanism includes:

a clutch housing;

a plurality of clutch shoes accommodated in said clutch housing so that when said clutch shoes move outward, outer peripheral surfaces thereof are capable of coming in frictional contact with an inner surface of said clutch housing, said clutch shoes each having a claw extending in an axial direction of said input shaft;

a clutch cam secured to said input shaft to lie between said clutch shoes, said clutch cam being adapted to move said clutch shoes so that the outer peripheral surfaces thereof come in frictional contact with the inner surface of said clutch housing by a cam action in response to rotation of said input shaft; and a shift ring having claw restraining grooves corresponding in number to said claws, said shift ring being movable between a first position at which said claws are released from said claw restraining grooves to allow said clutch shoes to come in frictional contact with the inner surface of said clutch housing and a second position at which said claws are received in said claw restraining grooves to restrain said clutch shoes from moving so as to come in frictional contact with the inner surface of said clutch housing;

wherein when the user actuates said throttle trigger to establish the forward mode, said shift ring moves to said first position, whereas when the user actuates said throttle trigger to establish the reverse mode, said shift ring moves to said second position.

\* \* \* \* \*